July 26, 1955
J. S. ALFORD ET AL
2,713,767
FUEL AND VARIABLE AREA NOZZLE REGULATING
APPARATUS FOR THERMAL POWERPLANT
Filed June 30, 1949
2 Sheets-Sheet 1
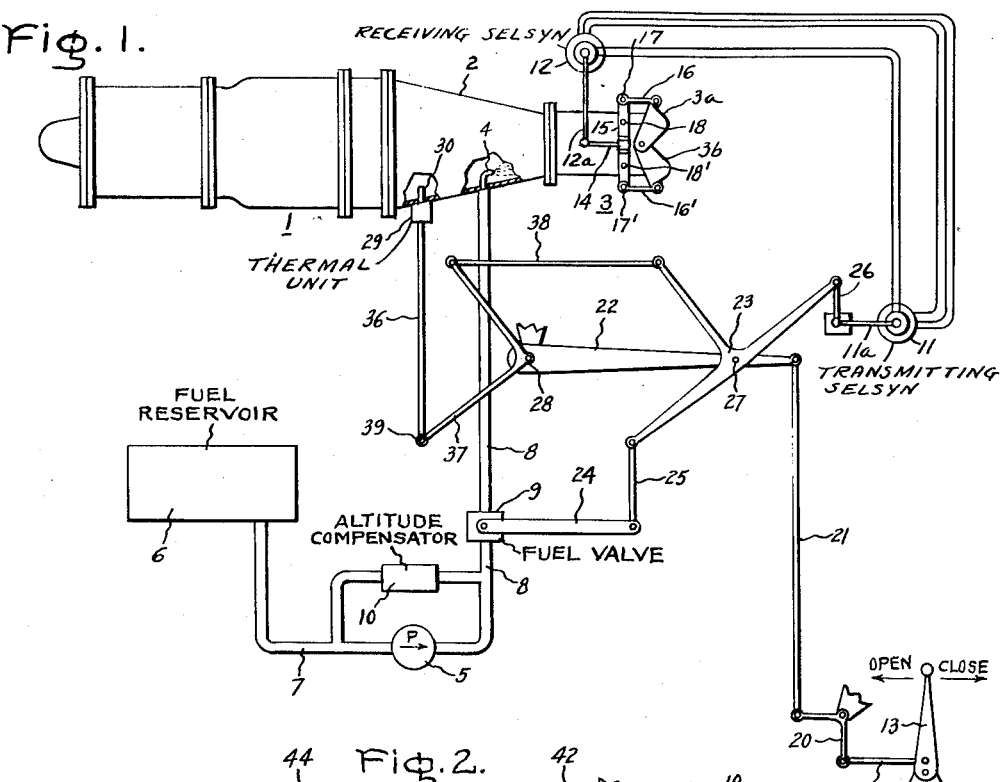
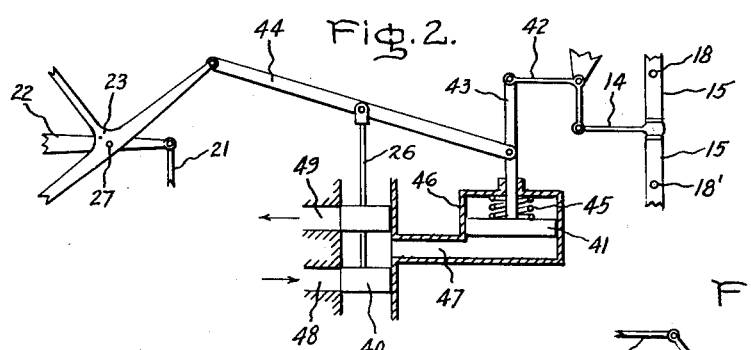
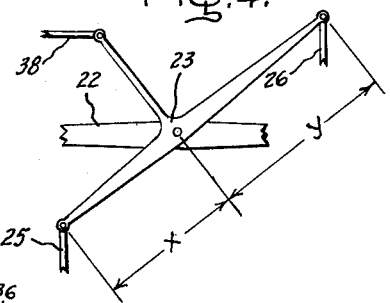
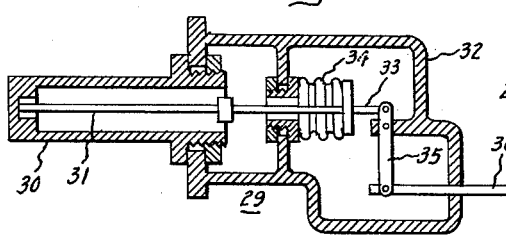
Inventors:
Joseph S. Alford,
Donald F. Warner,
by Warell F. Mack
Their Attorney.

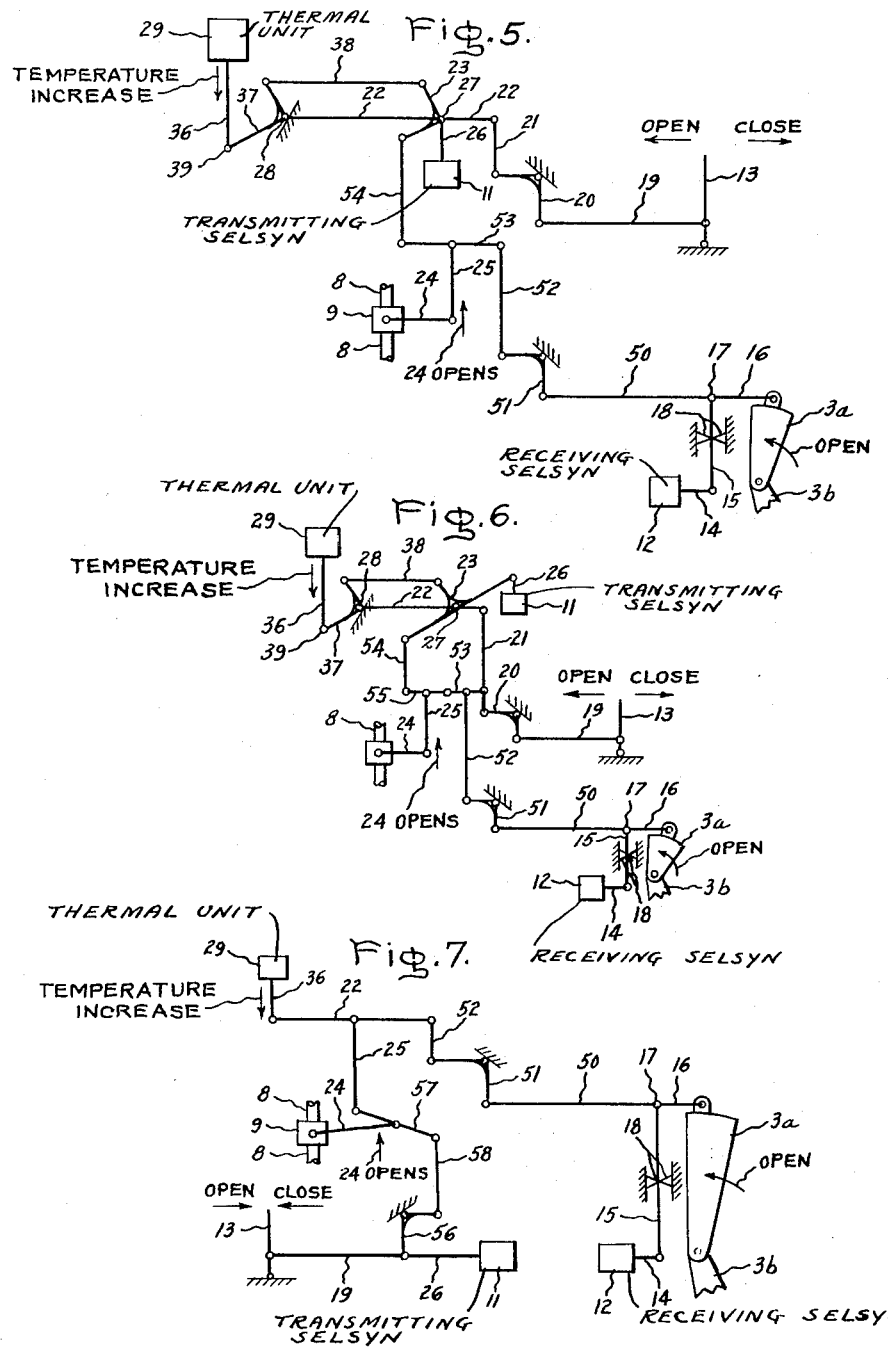

United States Patent Office 2,713,767
Patented July 26, 1955

2,713,767

FUEL AND VARIABLE AREA NOZZLE REGULATING APPARATUS FOR THERMAL POWERPLANT

Joseph S. Alford, Nahant, and Donald F. Warner, Swampscott, Mass., assignors to General Electric Company, a corporation of New York Application June 30, 1949, Serial No. 102,388

10 Claims. (Cl. 60—35.6)

This invention relates to thermal powerplants and has particular reference to fuel controls for combustion systems of such powerplants. It has particular utility in connection with reheat combustion systems of gas turbine powerplants for effecting the propulsion of aircraft, and it is this application of the invention which we have elected specifically to illustrate and describe. It is to be understood, however, that the invention is not limited thereto, necessarily.

A gas turbine powerplant for the propulsion of aircraft may include an air compressor, combustion apparatus, and a gas turbine arranged in series flow relation. In such a powerplant the turbine is driven by hot gases generated by the compressor and combustion apparatus, and the turbine extracts at least sufficient power from these gases to drive the compressor. The power remaining in the hot gases may be used to propel the aircraft by discharging the gases rearwardly from the turbine through a suitable propelling nozzle. Powerplants of this type are more particularly described in Patent 2,432,359—Streid, and in a copending application of Alan Howard, Serial No. 541,565, filed June 22, 1944, and assigned to the same assignee as the present application. The power available for propelling the aircraft may be augmented by one or more of several known methods. One way of achieving such thrust augmentation is by "reheating" the motive fluid discharged from the turbine before it is finally discharged from the propelling nozzle. Such a system is described in a copending application in the name of Edward Woll, Serial No. 80,696, filed March 10, 1949; and also assigned to the same assignee as the present application.

When a reheat system of the type described is employed in conjunction with such a gas turbine powerplant, it is necessary, in the interests of satisfactory operation, economy, and safety, to employ a variable propulsion nozzle, the discharge area of which can be varied to suit the varying operating conditions. The use of a variable area nozzle may also be desirable in gas turbine powerplants employing no reheat system, since the use of such a nozzle permits the available thrust to be increased or diminished without changing the rotational speed of the powerplant. Furthermore, the acceleration characteristic of the powerplant may be greatly improved by opening the variable nozzle during acceleration periods.

Accordingly, it is an object of the invention to provide a novel control system for an energy converting device which will properly coordinate the quantity of fuel supplied to the powerplant and the degree of opening of a controlled flow area.

It is also an object of the invention to provide regulating means for a thermal powerplant which will maintain an operating pressure at a substantially constant predetermined level above the ambient atmospheric pressure regardless of variations in fuel flow.

A further object is to provide temperature limiting means which will prevent critical temperatures within the powerplant system from exceeding preselected values, thereby obtaining improved powerplant life and greater safety.

Still another object is to provide regulating means in a thermal powerplant wherein objectionable hunting is minimized.

Other objects and advantages will be apparent from the following description taken in connection with the accompanying drawings, in which Fig. 1 is a diagrammatic representation of a reheat control system for a gas turbine powerplant in accordance with the invention; Fig. 2 is a modified embodiment of the arrangement shown in Fig. 1 wherein a servomechanism of the hydraulic type is employed; Fig. 3 shows a temperature responsive thermal unit for use with the invention; Fig. 4 is a detailed view of the modulating linkage; Fig. 5 is a modified embodiment of the arrangement shown in Fig. 1 wherein the rate of opening of the fuel control valve is approximately limited to the rate of opening of the variable nozzle; Fig. 6 is another modification in which the rate of opening of the fuel valve is exactly limited to the rate of opening of the variable nozzle; and Fig. 7 is still another modification wherein the nozzle actuating means is not subjected to hunting.

Referring now to Fig. 1, a gas turbine is illustrated at 1. Fluid discharged by the turbine is conveyed through an exhaust conduit 2 to a variable area nozzle 3. Fuel for heating the fluid subsequent to its discharge from the turbine is introduced into the exhaust conduit 2 by suitable injecting means 4. Fuel is delivered to the injection means 4 by a pump 5 from a fuel reservoir 6 through connecting conduits 7, 8. Included in conduit 8 are valve means 9 for controlling the rate of flow of fuel to the injection means. Valve 9 may be of the type which includes shutoff as well as regulating means controlled by a single lever similar to that disclosed in a copending application in the name of Samuel R. Barr, Serial No. 630,673, filed November 24, 1945, now Patent 2,485,349, but it will be obvious that separate shutoff and regulating means may be employed if desired.

In powerplants intended for use at sea level or at a substantially constant altitude, it may be a relatively simple matter to provide a fuel system and regulating means of the proper capacity. In aircraft service, however, where the powerplant is intended for operation over a wide range of altitude, and where the fuel requirements of the powerplant vary as a function of altitude, it is often important that altitude compensation be provided which will limit the pressure delivered by the fuel pump 5 to the regulating valve 9 in accordance with a preselected function of the ambient atmosphere. To this end we provide an altitude compensating device 10 connected in bypass relation with fuel pump 5. The details of one type of compensating device suitable for this purpose are described in U. S. Patent 2,408,836—Warner.

A servomechanism comprising transmitting and receiving units 11, 12, respectively, is employed to cause the variable area nozzle to open or close in accordance with signals from a manual control lever 13. The receiving unit 12 serves as an actuator to open or close the variable area nozzle in accordance with signals received from the transmitting unit 11. The transmitting and receiving servomechanism may be of any well-known type such as electrical, as illustrated in Fig. 1, or hydraulic, as shown in Fig. 2. Still referring to Fig. 1, if an electrical selsyn type servomechanism is employed, the transmitting and receiving units, 11, 12, respectively are electrically connected in a well-known manner clearly indicated in the drawings.

The receiving or actuator unit 12 is provided with a motion transmitting member 14, the movements of which are transmitted to the movable elements 3a, 3b of the variable area nozzle by suitable connecting linkage members 15, 16. Linkage member 15 is U-shaped and of slightly larger diameter than the outside diameter of exhaust conduit 2. It is connected to member 14 and to connecting members 16, 16′ by any suitable and well-known pinned-joint or ball-and-socket arrangements 17, 17′. Member 15 is rotatably supported by suitable journals or pivots 18, 18′ secured to the nozzle so that axial movement of actuator member 14 causes member 15 to pivot on journals 18, 18′ and thereby produce axial movement of movable nozzle portions 3a, 3b in an opposite direction to the movement of member 14.

The transmitting unit 11 is connected by linkage members 19—23 to the manual control lever 13 so that movements of the control lever produce a movement of rod member 26 in direct proportion thereto. Control lever 24 of valve 9 is connected to lever 23 by a connecting member 25 so that movements of the manual control lever 13 also produce a movement of valve lever 24 in direct proportion to the movement of manual control 13.

It is desirable to employ flexibility at the points of connection between the various linkage members 13, 19—26 in order to allow limited angular relative movement between the various linkage members. An important feature of the invention is that linkage member 23 is connected to member 22 at pivot 27 to permit angular movement of member 23 in either direction relative to member 22, the left-hand end of member 22 being supported by a fixed pivot 28.

The transmitting unit 11 is provided with a motion receiving member 26, which is connected to member 23, for receiving movements in direction proportion to movements of the manual control lever 13. The receiving unit 12 serves as the actuating means for opening and closing the variable area nozzle, and the movable portions 3a, 3b of the nozzle are connected to actuator member 14 by suitable linkage members 15—17, as previously indicated. These members are arranged so that an upward movement of motion receiving member 26 causes a proportional movement of member 14 to the right, which in turn causes nozzle members 3a, 3b to move to the left, thus opening or increasing the nozzle area. Similarly, upward movements of linkage member 25 cause the valve 9 to open and thus increase the rate of fuel flow.

As illustrated in Fig. 1 and as previously indicated, valve 9 is a combined throttle and shutoff valve with a single control lever 24. That is, in the first few degrees of movement of lever 24, for example, the first 10–20 degrees, the shutoff portion of the valve moves from a closed to fully-open position. Further movement of lever 24 effects positional changes in the throttling portion of the valve without further effect on the shutoff portion. The mechanical details of such a valve are not material to an understanding of the present invention and are more particularly disclosed in other copending applications, specifically, Serial No. 630,673, filed November 24, 1945, now Patent 2,485,349, and Serial No. 682,554, filed July 10, 1946, now Patent 2,510,617, in the name of Samuel R. Barr, and assigned to the assignee of the present application. It will be obvious, of course, to persons skilled in the art, that separate shutoff and throttling valves may be included in fuel conduit 8 with the operating lever of the throttling valve suitably connected by mechanical linkage so as to function in the manner described. At this point sufficient structure has been disclosed to describe an operable control system which will vary the area of the discharge nozzle in direct proportion to the rate of fuel flow.

The efficiency, economy of operation, and life of a gas turbine powerplant vary considerably with operating temperatures. Actual service experience has demonstrated that a practical and satisfactory criterion of the general temperature level at which an aircraft powerplant of the type described operates is the temperature of the gases discharged from the turbine. The output of such powerplants increases with increasing temperature level, while the life decreases. Accordingly, for maximum output it is desirable to operate such a powerplant at the maximum safe temperature which is consistent with the desired life expectancy. This is accomplished in accordance with our invention by the provision of means permitting operation up to a predetermined maximum temperature of the turbine exhaust gases but preventing operation at temperatures exceeding that value in order to prevent excessive stresses and premature deterioration of certain structural elements of the powerplant.

Again referring to Fig. 1, temperature control means are provided which include mechanism arranged to change the angularity of modulating member 23 with respect to member 22. Upon exceeding the preselected temperature limit, it is desirable in the interest of safety that the thermal means take over control of the fuel supply pressure, and at the same time effect an increase in the flow area of the variable area nozzle, since both of these changes in operating conditions effect a decrease in the temperature of the turbine exhaust gases.

The temperature responsive means shown in the drawings includes a thermal unit 29, Figs. 1 and 3, secured to the exhaust conduit 2 and having a tubular end portion 30 projecting into the exhaust passage leading from the turbine. The thermal unit comprises outer tube 30 and an inner rod 31 centrally disposed therein and suitably secured to the lower end of tube 30. The tube and the rod are made of materials having different coefficients of linear expansion. For example, the tube 30 may be of a suitable high temperature material such as stainless steel and the rod 31 may be made of fused quartz. One end of the metallic tube 30 is secured to casing 32. Inner rod 31 is provided with an extension 33 which is sealed to the casing by means including a flexible bellows 34. Extension 33 projects beyond the bellows 34 and is connected to a motion reversing lever 35 which is pivoted to a portion of casing 32. A motion transmitting rod 36 projects through the casing and is also connected to reversing lever 35. Upon increase in temperature, the metal tube, having a higher coefficient of expansion than the inner quartz rod, expands to the left in Fig. 3 and thereby causes bellows 34 to collapse. This effects movement of rod 36 in a direction opposite to the movement of metal rod 30.

Referring now to Fig. 1, rod 36 is arranged to move downward upon an increase in temperature. Movements of rod 36 are communicated to member 23 by a bellcrank 37 and rod 38 since rod 36 is directly connected to bellcrank 37 at pivot 39. Bellcrank 37 is pivoted coaxially with pivot 28 to permit angular movement of the bellcrank and member 23 relative to member 22 irrespective of the operating position thereof.

In operation, with the powerplant operating under a given set of conditions, moving the manual control lever 13 to the left causes an upward movement of linkage member 21 through connecting members 19—20. Member 22, therefore, moves upward a proportional amount, causing movement of throttle control lever 24 and movement receiving member 26 in a direction tending to open the throttle valve and the variable area nozzle, respectively. It is to be noted that throttle 9 and the variable nozzle portions 3a, 3b are thereby caused to open by an amount which is directly proportional to the movement of manual control lever 13. If, due to variations in manufacturing tolerances, or for any other reason, the temperature under the new operating condition exceeds the preselected safe value, the action of the temperature responsive device 29 causes rod 36 to move downward and thereby effect a rotation of modulating member 23 in a counterclockwise direction about pivot 27. This counterclockwise rotation causes the control lever of valve 9 to move in a downward direction, thereby reducing the fuel flow, and at the same time member 26 is moved upward which in turn causes the variable nozzle portions 3a, 3b to open and increase the flow area until the degree of opening of the discharge nozzle 3 and the throttle valve 9 are properly coordinated to accommodate the desired rate of fuel flow without exceeding the preselected safe temperature. If the temperature under the new operating condition is below the preselected safe value, the thermal unit causes rod 36 to move upward and effect a clockwise rotation of modulating member 23, thus increasing the fuel flow to a value commensurate with the variable nozzle opening and the preselected safe temperature value.

Fig. 2 illustrates an arrangement wherein the system shown in Fig. 1 is modified to permit the use of a servomechanism of the hydraulic type. In this embodiment, the electrical servo units 11, 12 are omitted and a pilot valve 40, a spring biased piston 41, linkage members 42—44, and biasing spring 45 are substituted therefor. Piston 41 is reciprocally movable in a cylinder 46 and is biased in a downward direction by spring 45 so that nozzle portions 3a, 3b are thereby biased to the open position. Communication is established between cylinder 46 and pilot valve 40 by the provision of fluid passage 47. Hydraulic fluid under pressure is supplied to an inlet passage 48 and is drained from the servomechanism by exit passage 49. Suitable pumping means, a fluid reservoir, and connecting conduits are required for supplying hydraulic fluid to passage 48 and for draining fluid from passage 49 but are not essential to an understanding of the invention and, therefore, are not shown.

The arrangement shown in Fig. 2 is further modified from that shown in Fig. 1 in that rod 26 is suitably secured at one end to pilot valve 40 and is connected at the other end to floating lever 44 instead of to member 23. One end of floating lever 44 is connected to member 23 and the other end is connected to piston rod 43. In the position shown in the drawing, the pilot valve simultaneously interrupts communication between passages 47, 48 and also between passages 47, 49. The pilot valve can remain in the position shown only when the pressure force of the hydraulic fluid acting on the under side of piston 41 is exactly balanced by the downward force of spring 45. If modulating member 23 is caused to move upward, pilot valve 40 will momentarily be lifted by the corresponding upward movement of lever 44 and rod 26. This establishes communication between passages 47, 49 and allows fluid to drain from cylinder 46 through passages 47, 49, respectively, thus reducing the fluid pressure on the under side of piston 41 and allowing it to be forced downward under the action of biasing spring 45. Member 15 is connected to the movable nozzle portions 3a, 3b in the same manner as is indicated in Fig. 1, and thus it will be apparent that a downward movement of piston 41 opens the variable area nozzle, or, in other words, increases the flow area thereof. When piston 41 has moved downward by an amount directly proportional to the upward movement of member 23, the pilot valve will have been returned to its original position as shown in Fig. 2, because of the action of lever 44 which is connected to member 23, piston rod 43, and the pilot valve lifting rod 26, thus interrupting the previously established communication between passages 47 and 49. Similarly, if member 23 is caused to move downward, pilot valve 40 drops and establishes communication between fluid passages 47, 48 so that pressurized fluid is admitted to cylinder 46, thereby forcing the piston 41 upward against the action of biasing spring 45 until the upward movement of the piston rod 43 has restored the pilot valve to its original position by the motion of connecting members 44, and 26 in the manner described above. This arrangement will be recognized by those skilled in the art as a proportional type of servomechanism provided with automatic follow-up. That is, an upward or downward movement of the right-hand end of member 23 will cause a directly proportional movement of piston rod 43 and thus of variable nozzle portions 3a, 3b in a direction opposite to the movement of member 23.

Referring now to Figs. 1 and 4, the temperature override portion of the control is designed with the x—y ratio arranged to obtain the desired degree of sensitivity in terms of temperature reduction, of the rate of closing fuel valve 9 as compared to the rate of increasing the variable nozzle area. The actual value of the x—y ratio for a particular design will of course be dependent upon many factors, such as whether the control is intended for service at primarily high altitudes or at relatively low altitudes, the time required to fully close the fuel valve 9 as compared to the time to cause the variable nozzle portions 3a, 3b to move from their fully-closed to fully-open position, frictional forces involved, actuating power available, etc. In general, the x—y ratio should be made of such value as to obtain approximately the same degree of sensitivity in terms of temperature correction, upon reducing the rate of fuel flow by closing valve 9 as is obtained upon opening or increasing the flow area of the variable nozzle.

In service it is extremely difficult to provide means for opening or closing the variable area nozzle at rates approximating that at which the fuel control valve can be opened or closed. In general, the variable area jet nozzle will open or close at a considerably slower rate than the fuel control valve. With the arrangement used in Fig. 1, a rapid advance of the manual control 13 may immediately inject a rather large amount of fuel into the exhaust conduit 2. Since the fuel will burn at an extremely rapid rate, and the actuator 12 may require several seconds to open the variable area nozzle to a degree commensurate with the increased fuel flow, such a transient condition may result in excessive temperatures, an excessive increase in turbine exhaust pressure, and possible stalling of the compressor, unless the rate of fuel flow can be limited approximately to the rate at which the variable area nozzle is opened.

Means for limiting the rate of opening of control valve 9 to the approximate rate of the opening of the variable nozzle are provided in the arrangement shown in Fig. 5. Like elements bear the same notation as in Fig. 1, and the mechanical linkage has been rearranged somewhat so as to limit the opening of the fuel valve 9 to the approximate rate of opening of the variable area nozzle 3. It will be noted that the modulating member 23 differs considerably from that shown in Fig. 1. Specifically, the y value referred to in Fig. 4 is made equal to zero, and rod 26 is connected to member 22 or 23 at the location of pivot 27. New linkage members 50—54 have been added to connect the movable portions 3a, 3b to linkage member 23 at the location formerly occupied by rod 25. Rod 25 is relocated to connect control lever 24 of fuel valve 9 to member 53 at a convenient location between the two extremities of the latter member.

In operation the manual control lever 13 is moved to the left to increase the rate of fuel supply. This causes a movement of rod 19 to the left which is transmitted through bellcrank 20, thereby causing an upward movement of rod 21 and lever 22. This causes an approximate equal upward motion of rods 26, 54. Until the variable nozzle portions 3a, 3b begin to move, linkage members 50—52 will not move, and hence the upward motion of rod 25 and the resulting opening of fuel valve 9 is limited to only a fractional part of the upward motion of linkage member 22 and 54. After the variable area nozzle begins to open, rod 50 is thereby caused to move to the left and this motion is transmitted by bellcrank lever 51 to cause an upward movement of member 52. Since member 26 has already assumed its new position, the position of rod 54 is fixed and the upward motion of rod 52 causes the floating lever 53 to pivot about its point of connection with rod 54, thus further opening the fuel valve 9 at the approximate rate at which the variable area nozzle is opened.

For the reasons indicated above in connection with Fig. 5, it is desirable to exactly match the rate at which the fuel flow is increased to the rate of opening of the variable area nozzle. This is accomplished in accordance with the invention by the provision of linkage means for limiting the rate of movement of valve lever 24 to coincide with the rate of movement of movable nozzle portions 3a, 3b. Referring now to Fig. 6, the linkage arrangement is substantially the same as that shown in Fig. 5 with the exception of one new linkage member 55, and the x—y ratio is again made a definite value wherein the y value is not zero. New linkage member 55 is a floating lever connected at one end to rod 54 and at the other end to floating lever 53. Rod 25 is connected to floating lever 55 at a location between the extremities of the latter member.

The operation is substantially the same as that described in connection with Fig. 5 and the added flexibility provided by new member 55 permits the respective rate of opening of fuel valve 10 and discharge nozzle 3 to be matched exactly. When the manual control lever 13 is moved in a direction to increase the rate of fuel supply, rod 19 moves to the left, thereby causing an upward movement of rods 21, 26 and 54. However, rod 52 will remain stationary until the nozzle portions 3a, 3b begin to move. The upward motion of rod 21 therefore causes floating lever 53 to pivot about its point of connection with rod 52 and thereby lower the point of connection of floating levers 53 and 55. Lowering of the righthand end of floating lever 55 at least partially offsets the effect of the upward motion of rod 54. Obviously by proper selection of the lever ratios for levers 53, 55 valve control lever 24 can be made to remain stationary until movement of the variable area nozzle causes movement of rod 52. It will also be obvious that after rod 52 begins to move, control lever 24 is caused to move at a rate exactly equal to or proportional to the rate at which rod 52 is moving.

If the operating temperature of the turbine exhaust gases exceeds the preselected safe value and thereby causes a counterclockwise rotation of modulating lever 23 about pivot 27 previously described in connection with Fig. 1, an upward motion is thereby imparted to rod 26 and at the same time rod 54 is caused to move down. The upward movement of rod 26 signals the actuator unit 12 to open the variable area nozzle and the downward motion of rod 54 effects an immediate reduction in the rate of fuel supply even though the variable area nozzle has had insufficient time to respond to the signal motion of rod 26, since rods 21, 52 and lever 53 are therefore stationary.

An arrangement is shown in Fig. 7 in which the electrical elements of the servomechanism are not subjected to the more or less constant hunting which may be present in the arrangements previously described. In order to eliminate hunting from the electrical portions of the system, the servomechanism units 11, 12 are arranged to position the nozzle elements 3a, 3b directly in response to movements of the manual control lever 13 and means are provided whereby the fuel valve and the temperature responsive means are connected to the variable area nozzle in such a manner that the fuel valve is caused to assume the proper degree of opening to match a preselected degree of opening of the variable area nozzle.

Referring now to Fig. 7, members 23, 37, and 38 are omitted, and member 22 becomes a floating lever having its ends connected to rods 36 and 52. The fuel valve control lever 24 is connected to floating lever 22 by rod 25 and floating lever 57, as indicated in the drawing. Floating lever 57 is also arranged to receive movements of the manual control lever 13 by connecting linkage members 19, 56 and 58. Rod 26 and bellcrank 56 are connected to rod 19 so that motion of the control lever produces a change in the nozzle setting as well as in the fuel setting. The thermal unit 29 is connected to lever 22 by rod 36. Any movement of the variable area nozzle is communicated to lever 22 by the provision of connecting linkage members 58—52.

In operation, any movement of manual control lever 13 is transmitted to rod 26 by connecting rod 19. The movement of control 13 is to the right for opening nozzle portions 3a, 3b. Movements of rod 26 are transmitted through the servomechanism units 11, 12 and produce a corresponding movement to the right of rod 14 thus opening the nozzle. As previously indicated, a definite time interval will elapse from the time the transmitting servomechanism 11 receives a signal from the manual control 13 before the variable area nozzle begins to move. In other words, lever 22 and rods 25, 52 are momentarily stationary. Since movements of control lever 13 are also communicated to rod 58 and rod 25 is momentarily stationary, floating lever 57, and, therefore, valve control lever 24 will be raised or lowered thereby momentarily increasing or decreasing the fuel flow. As soon as motion of the control lever 13 is terminated, rod 58 becomes stationary so that further movement of valve control lever 24 is directly proportional to the movement, as well as the rate of movement, of the variable area nozzle. Thus the variable area nozzle is caused to assume a definite position in accordance with the manual control setting and the fuel flow is automatically adjusted to a rate commensurate with the degree of nozzle opening. If, for any reason, the temperature of the turbine exhaust gases tends to exceed the preselected safe value, rod 36 moves downward thus lowering rod 25, floating lever 57, and fuel valve control lever 24, thereby reducing the fuel flow.

Obviously various modifications of the preceding arrangements will suggest themselves to those skilled in the art, and it will also be obvious that the invention is not limited to the specific embodiments described but is capable of much wider application, and it is intended to cover in the appended claims all such changes and modifications that come within the true spirit and scope of the invention.

What we claim as new and desire to secure by Letters Patent of the United States is:

1. In an energy-converting apparatus including a combustion chamber, variable area nozzle means for varying the discharge flow area of said apparatus, means for supplying fuel under pressure and at a variable rate of flow, means including a flow regulator connecting the supply means to the combustion chamber, means including a control member for selecting the desired rate of fuel flow, actuator means connected to the variable area nozzle means and operable to vary said discharge area in response to movements of said control member and in direct proportion to said movements, and means including a floating linkage member connecting said flow regulator to the control member and to the variable area nozzle means for limiting the rate of increase of the rate of fuel flow to the approximate proportional rate of increase of the discharge flow area.

2. In an energy-converting device the combination comprising a combustion chamber, means for varying the discharge flow area of said device, means for supplying fuel under pressure and at a variable rate of flow, means including a flow regulator connecting the fuel supply means to the combustion chamber, means including a control member for selecting a desired rate of fuel flow, actuator means connected to said area varying means and operable to vary said discharge area in response to movements of said control member and in direct proportion to said movements, and rate limiting means including at least two floating linkage members connecting said flow regulator to the control member and to the area varying means for preventing the rate of increase of the rate of fuel flow to exceed the proportional rate of increase of the discharge flow area.

3. In a thermal powerplant including a combustion chamber, variable area nozzle means for varying the discharge flow area of the powerplant, means for supplying fuel under pressure and at a variable rate of flow, means including a flow regulator connecting the supply means to the combustion chamber, means including a control member for preselecting a desired rate of fuel flow, actuator means connected to said nozzle means and operable to vary said discharge area in response to movements of said control member and in direct proportion to said movements, means including a floating linkage member connecting the variable area nozzle means to the control member and to said flow regulator for limiting the rate of increase of the fuel flow rate to the approximate rate of increase of the discharge flow area, and means connected to said fuel rate preselecting means and operable to override the latter means in response to an operating temperature of said powerplant in excess of a preselected value.

4. In a gas turbine powerplant including a combustion chamber, means for varying the discharge flow area of the powerplant, means for supplying fuel under pressure and at a variable rate of flow, means including a flow control device connecting the supply means to the combustion chamber, means including a control member for preselecting a desired rate of fuel flow, actuator means connected to said area varying means and operable to vary said discharge area in response to movements of said control member and in direct proportion to said movements, response limiting means including at least two floating linkage members connecting said area varying means to the fuel rate preselecting means and to the flow control device for preventing the rate of increase of the fuel flow rate from exceeding the rate of increase of the discharge flow area, and means responsive to an operating temperature of the powerplant connected to said fuel rate selecting means and operable to override the latter means when said temperature exceeds a preselected value.

5. In a thermal powerplant for aircraft comprising a combustion system and a variable discharge area, means for varying the discharge flow area of the powerplant, means for supplying fuel under pressure and at a variable rate of flow, conduit means including flow control means and connecting said supply means to the combustion system, and automatic regulating means including altitude compensating means connected at a location between said supply means and said flow control means for reducing the fuel pressure at said location in accordance with a preselected schedule in response to reductions in the ambient atmospheric pressure, means for preselecting a desired rate of fuel flow, actuator means connected to said area varying means for varying said discharge area in direct proportion to the fuel flow, and means connecting the variable area nozzle means to said fuel rate selecting means for limiting the rate of increase of the fuel flow to the approximate proportional rate of increase of the discharge flow area.

6. In a combustion system for an aircraft powerplant comprising a combustion chamber, means for varying the discharge flow area of the combustion chamber, means for supplying fuel under pressure and at a variable rate of flow, conduit means including fuel regulating means and connecting the combustion chamber to the fuel supply means, automatic control means including altitude compensating means for reducing the pressure of the fuel at the upstream side of said regulating means in response to variations in the ambient atmosphere and means for preselecting a desired rate of fuel flow, actuator means connected to said variable area means for varying the discharge area in direct proportion to the fuel flow, and response limiting means including a linkage member connecting said variable area means to the fuel regulating means for preventing the rate of increase of fuel flow to exceed the rate of increase of the discharge flow area.

7. In an exhaust reheat system of a thermal powerplant for aircraft comprising a combustion chamber, means for supplying fuel to said chamber under pressure, means for controlling the rate of flow of the fuel, means for regulating the flow of combustion products from said combustion chamber, and control means comprising altitude compensating means for reducing the pressure of the fuel at the upstream side of said fuel control means in accordance with a preselected schedule and in response to variations in the ambient atmospheric pressure, means for preselecting a desired position of said flow regulating means, means mechanically connecting said flow regulating means to said fuel control means for causing movements of said control means in direct proportion to movements of said flow regulating means, and means connected to said fuel control means for modulating the position of the latter means in response to an operating temperature of the powerplant.

8. In a thermal powerplant for aircraft having a combustion system comprising a combustion chamber, means for varying the discharge flow area of the combustion chamber, means for supplying fuel under pressure and at a variable rate of flow, conduit means including flow regulating means and connecting the combustion chamber to said supply means, altitude compensating means for reducing the pressure at a location upstream from said flow regulating means according to a preselected schedule in response to variations in the ambient atmospheric pressure, control means including means for preselecting a desired rate of fuel flow, actuator means connected to said variable area means and to said fuel selecting means for causing said discharge area and said fuel rate selecting means to vary in proportional relation, and means responsive to an operating temperature of said powerplant connected to said fuel rate selecting means and operable to override the latter means when said temperature exceeds a preselected value.

9. In a thermal powerplant for aircraft having a combustion system comprising a combustion chamber, means for varying the discharge flow area of the combustion chamber, means for supplying fuel under pressure and at a variable rate of flow, conduit means including flow control means and connecting the combustion chamber to said supply means, altitude compensating means connected at a location between said supply means and said flow control means for reducing the fuel pressure at said location in accordance with a preselected schedule in response to reductions in the ambient atmospheric pressure, means for preselecting a desired rate of fuel flow, actuator means connected to said preselecting means and said area varying means for varying said discharge area in direct proportion to the fuel flow, and means including a linkage member connecting the variable area nozzle means to said fuel rate selecting means for limiting the rate of increase of the fuel flow to the approximate proportional rate of increase of the discharge flow area, and means connected to said fuel rate selecting means and operable to override the latter means in response to an operating temperature of said powerplant in excess of a preselected value.

10. In a combustion system for an aircraft powerplant comprising a combustion chamber, means for varying the discharge flow area of the combustion chamber, means for supplying fuel under pressure and at a variable rate of flow, conduit means including fuel regulating means and connecting the combustion chamber to the fuel supply means, automatic control means including altitude compensating means for reducing the fuel pressure at the combustion chamber in response to variations in the ambient pressure and means for preselecting a desired rate of fuel flow, actuator means connected to said variable area means and to said preselecting means for varying the discharge area in direct proportion to the fuel flow, and response limiting means including a linkage member connecting said variable area means to the fuel regulating means for preventing the rate of increase of fuel flow to exceed the rate of increase of the discharge flow area, and means responsive to an operating temperature of said system between said fuel supply means and said variable area means connected to the fuel regulating means and operable to override the latter means when said temperature exceeds a preselected value.

References Cited in the file of this patent

UNITED STATES PATENTS

| | | |
|---|---|---|
| 2,280,765 | Anxionnaz et al. | Apr. 21, 1942 |
| 2,457,595 | Orr, Jr. | Dec. 28, 1948 |
| 2,569,497 | Schiesel | Oct. 2, 1951 |

FOREIGN PATENTS

| | | |
|---|---|---|
| 919,004 | France | Nov. 18, 1946 |
| 941,556 | France | July 19, 1948 |